(12) United States Patent
Yoshimura

(10) Patent No.: US 12,072,490 B2
(45) Date of Patent: Aug. 27, 2024

(54) HEAD-MOUNTED DISPLAY REDUCING CARBON DIOXIDE EMISSION DURING THERMAL RECYCLING

(71) Applicant: SEIKO EPSON CORPORATION, Tokyo (JP)

(72) Inventor: Yoshihiro Yoshimura, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 18/173,091

(22) Filed: Feb. 23, 2023

(65) Prior Publication Data

US 2023/0273430 A1    Aug. 31, 2023

(30) Foreign Application Priority Data

Feb. 25, 2022   (JP) .................. 2022-028284

(51) Int. Cl.
*G02B 27/01*   (2006.01)
*G02B 6/42*    (2006.01)
*G05D 23/19*   (2006.01)

(52) U.S. Cl.
CPC ......... *G02B 27/017* (2013.01); *G02B 6/4212* (2013.01); *G02B 6/4214* (2013.01); *G05D 23/1904* (2013.01); *G02B 2027/0178* (2013.01)

(58) Field of Classification Search
CPC .. G02B 27/017; G02B 6/4212; G02B 6/4214; G02B 2027/0178; G05D 23/1904
See application file for complete search history.

(56) References Cited

U.S. PATENT DOCUMENTS

| | | | |
|---|---|---|---|
| 6,772,448 B1* | 8/2004 | Hockaday | A61F 9/028 2/435 |
| 2017/0180685 A1 | 6/2017 | Takagi et al. | |
| 2018/0239131 A1* | 8/2018 | Cornelius | G06T 19/006 |
| 2018/0329212 A1* | 11/2018 | Aiki | H01L 27/156 |
| 2021/0149202 A1* | 5/2021 | Machida | H04N 5/64 |

FOREIGN PATENT DOCUMENTS

JP    2017111363    6/2017

* cited by examiner

*Primary Examiner* — Afroza Chowdhury
(74) *Attorney, Agent, or Firm* — JCIPRNET

(57) ABSTRACT

A head-mounted display includes a first image light output unit configured to output first image light, a first light guiding unit configured to guide the first image light output by the first image light output unit, a first optical member configured to reflect the first image light guided by the first light guiding unit to a predetermined first position, and a bridge portion provided to sandwich the first optical member between the first light guiding unit and the bridge portion, wherein at least a part of the bridge portion contains an environmental material.

13 Claims, 8 Drawing Sheets

ENVIRONMENTAL MATERIAL COMPARISON TABLE

| | | GLASS TRANSITION TEMPERATURE [°C] | TENSILE STRENGTH [MPa] | FRACTURE STRENGTH [MPa] | FLEXURAL STRENGTH [MPa] |
|---|---|---|---|---|---|
| PRESENT MATERIAL | POLYLACTIC ACID (PLA) | 50~60 | 60~65 | 50~60 | 90~100 |
| OTHER BIODEGRADABILITY | *POLYHYDROXYBUTYRIC ACID [PHB, P(3HB)] | 5~15 | 40~50 | 10~20 | NO LISTED |
| NON-BIODEGRADABILITY | BIO-POLYETHYLENE | -125 | 20~35 | NO LISTED | 20~30 |
| KNOWN MATERIAL | CYCLOOLEFIN POLYMER (LIGHT GUIDE PLATE) | 139 | 73 | NO LISTED | 115 |

* POLYHYDROXYBUTYRIC ACID (PHB) IS A POLYESTER of 3-HYDROXYBUTYRIC ACID (KETONE BODY), AND IS A TYPE OF POLYHYDROXYALKANOIC ACID (PHA).

FIG. 8

| | PLA | BIO PBS | (BIO) PE (LOW DENSITY) | (BIO) PET |
|---|---|---|---|---|
| BIODEGRADABILITY | GOOD | GOOD | POOR | POOR |
| CRYSTAL MELTING POINT (°C) | 160~170 | 114 | 95~130 | 260 |
| GLASS TRANSITION TEMPERATURE (°C) | 50~60 | −32 | −120 | 80 |
| LOAD DEFORMATION TEMPERATURE (°C) | 55 | 97 | <100 | 120−160 |

FIG. 9

HEAD-MOUNTED DISPLAY REDUCING CARBON DIOXIDE EMISSION DURING THERMAL RECYCLING

The present application is based on, and claims priority from JP Application Serial Number 2022-028284, filed Feb. 25, 2022, the disclosure of which is hereby incorporated by reference herein in its entirety.

BACKGROUND

1. Technical Field

The present disclosure relates to a head-mounted display.

2. Related Art

Research and development has been performed on head-mounted displays that are mounted on a user's head and allow a user to visually recognize various images.

In this regard, a head-mounted display including a light guide plate in which a left-eye light guide plate that guides an image for the left eye and a right-eye light guide plate that guides an image for the right eye are integrally configured together with a bridge portion that transmits light is known (refer to JP-A-2017-111363).

However, electronic devices such as head-mounted displays are desired to be manufactured actively using environmental materials in order to reduce an amount of carbon dioxide emissions during thermal recycling. However, manufacturing of the head-mounted display using the environmental materials as described in JP-A-2017-111363 has not been considered. This is because properties of resin materials used in the manufacturing of known head-mounted displays are different from properties of environmental materials, and thus it has been difficult to simply replace the resin materials with the environmental materials.

SUMMARY

In order to solve the problem described above, an aspect of the present disclosure is a head-mounted display including a first image light output unit configured to output first image light, a first light guiding unit configured to guide the first image light output by the first image light output unit, a first optical member configured to reflect the first image light guided by the first light guiding unit to a predetermined first position, and a bridge portion provided to sandwich the first optical member between the first light guiding unit and the bridge portion, wherein at least a part of the bridge portion contains an environmental material.

BRIEF DESCRIPTION OF THE DRAWINGS

FIG. 8 is a diagram illustrating an example of a difference between properties of a known resin material and properties of an environmental material.

FIG. 9 is a diagram illustrating an example of a difference in properties between four types of environmental materials.

DESCRIPTION OF EXEMPLARY EMBODIMENTS

Embodiments

Exemplary embodiments of the present disclosure will be described below with reference to the drawings.
Overview of Head-Mounted Display Below, an overview of a head-mounted display according to an embodiment will be described.

The head-mounted display according to the embodiment includes a first image light output unit configured to output a first image light, a first light guiding unit configured to guide the first image light output by the first image light output unit, a first optical member configured to reflect the first image light guided by the first light guiding unit to a predetermined first position, and a bridge portion provided to sandwich the first optical member between the bridge portion and the first light guiding unit. And, at least a part of the bridge portion includes an environmental material. Thus, the head-mounted display can reduce an amount of carbon dioxide emission during thermal recycling while a decrease in convenience of a user due to the use of the environmental material is suppressed.

Hereinafter, a configuration of the head-mounted display according to the embodiment and processing performed by the head-mounted display will be described in detail.
Configuration of Head-Mounted Display First, the configuration of the head-mounted display according to the embodiment will be described by taking the head-mounted display 1 as an example. For convenience of description, the user of the head-mounted display 1 will be simply referred to as a user below.

Figure 1:
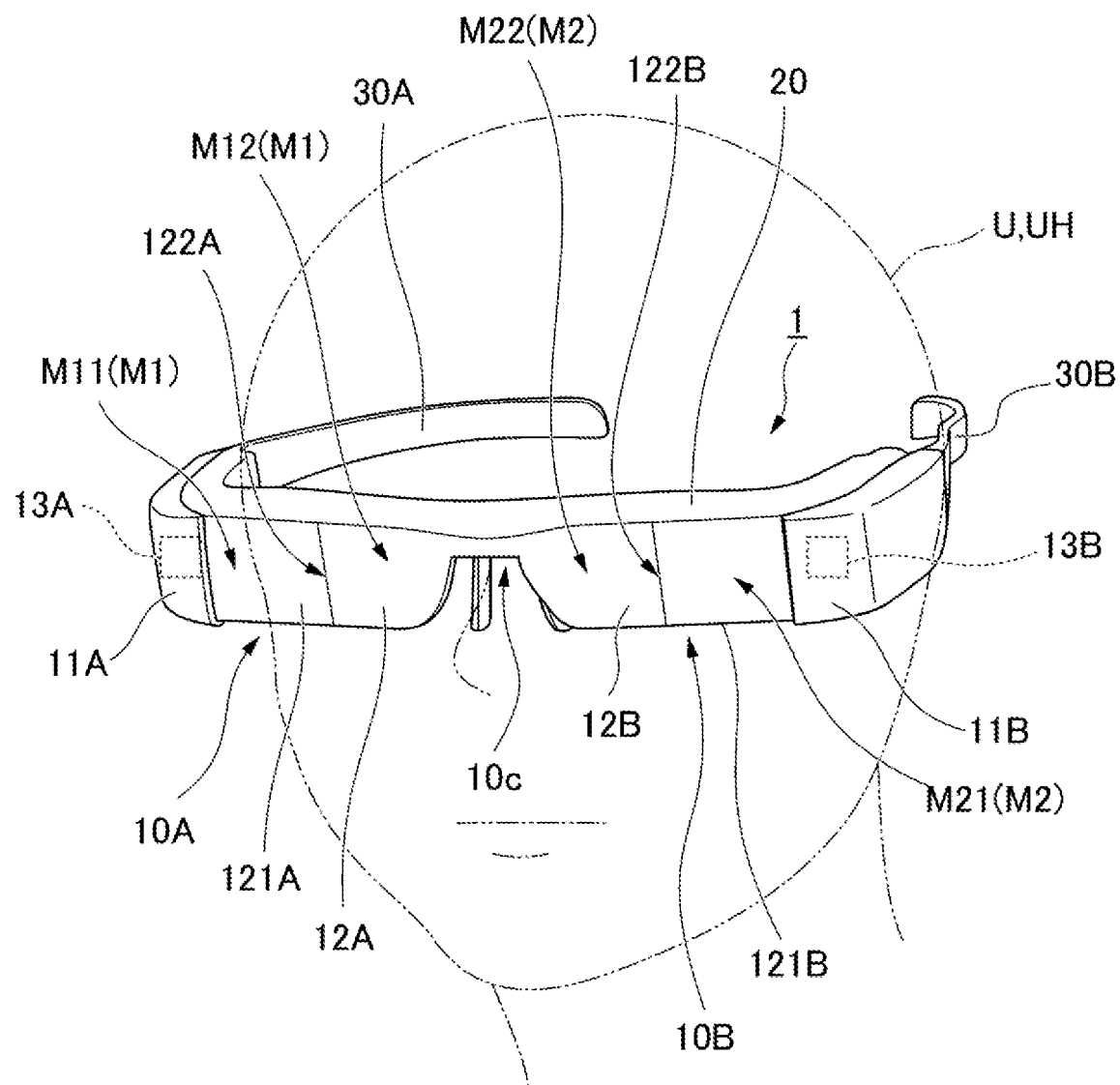
FIG. 1 is a schematic diagram illustrating an example of a configuration of a head-mounted display 1.

FIG. 1 is a schematic diagram illustrating an example of the configuration of the head-mounted display 1.

The head-mounted display 1 is a display device that has an eyeglasses-like appearance including a light guide member for a left eye and a light guide member for a right eye, is mounted on a head of a user, and causes the user to visually recognize an image for a left eye of the user and an image for a right eye of the user. In the example illustrated in FIG. 1, the head-mounted display 1 is mounted on a head UH of a user U. In addition, the head-mounted display 1 guides the image light indicating various images to the user's eyes by an optical member that transmits some of light such as a half mirror, causes the user to visually recognize the various images, and causes the user to visually recognize a scene visible through the optical member via light passing through the optical member.

The head-mounted display 1 includes a first display device 10A, a second display device 10B, a bridge portion 10C, a frame body 20, a first temple 30A, and a second temple 30B.

When the head-mounted display 1 is mounted on the user's head in a predetermined mounting method, the first display device 10A is a device that causes a first single eye which is one of two eyes of the user to visually recognize the first image light indicating the first image. In the following, as an example, a case in which the first single eye is the user's right eye will be described. The predetermined mounting method is a mounting method recommended by a manufacturer of the head-mounted display 1, and is, for example, a mounting method described in a manual of the head-mounted display 1.

The first display device 10A includes a first image light output unit 11A, a first light guiding unit 12A, and a first control device 13A.

The first image light output unit 11A is a device configured to output first image light based on first image information input from an external device. The first image information is information that indicates the first image, and may be information that indicates a still image, or may be information that indicates a moving image. In this example, the first single eye is the right eye of the user. In this case, the first image is a still image for the right eye, or a moving image for the right eye. The first image light output unit 11A may have any configuration as long as the first image light output unit 11A is capable of outputting the first image light based on the first image information input from the external device. The first image light output unit 11A is controlled by the first control device 13A.

The first light guiding unit 12A is a member including a light guide member for a first single eye in the head-mounted display 1. The first light guiding unit 12A includes a first member 121A, or includes a first member 121A and a part of the bridge portion 10C. Further, the first light guiding unit 12A further includes a first optical member 122A that reflects the first image light to a predetermined first position. Hereinafter, for convenience of description, a portion included in the first light guiding unit 12A in portions included in the bridge portion 10C is simply referred to as a part of the bridge portion 10C. In the following, as an example, a case in which the first light guiding unit 12A includes the first optical member 122A, the first member 121A, and a part of the bridge portion 10C will be described. In this case, a part of the bridge portion 10C is configured to transmit at least some of the light. In this case, a transmittance of light of the first member 121A and a transmittance of light of a part of the bridge portion 10C may be preferably substantially the same or the same, but may be different. Further, in this case, a refractive index of light of the first member 121A and a refractive index of a part of the bridge portion 10C are preferably substantially the same or the same, but may be different. Hereinafter, for convenience of description, a part of the bridge portion 10C is referred to as a first region R1. In FIG. 1, illustration of the first region R1 is omitted in order to prevent the drawing from becoming complicated. Further, the first light guiding unit 12A may be configured separately from the first optical member 122A.

The first member 121A is a member having a substantially flat plate shape that extends in a direction in which the first image light is output from the first image light output unit 11A. The first member 121A is a member that functions as a part of a light guide member for a first single eye in the head-mounted display 1. Thus, the first member 121A is a member that transmits at least some of the light. Among end portions of the first member 121A, an end portion on the above direction side is coupled to the first optical member 122A. In the following, as an example, a case in which the first member 121A is a member that transmits the whole of the light will be described. At least one of the first member 121A or the first region R1 may be a member that does not transmit light when the configuration of the head-mounted display 1 is such that the user is not caused to visually recognize the scene that the first single eye can see through the first member 121A and the first region R1. When the configuration of the head-mounted display 1 is such that the user is not caused to visually recog the scene that the first single eye can see through the first member 121A, the head-mounted display 1 may be configured not to include the first image light output unit 11A, or may be configured to include the first image light output unit 11A. When the first member 121A is a member that does not transmit light, and also the head-mounted display 1 is configured to include the first image light output unit 11A, for example, a path through which the first image light output from the first image light output unit 11A passes toward the first optical member 122A, an optical fiber through which the first image light passes toward the first optical member 122A, and the like are provided in the first member 121A. In addition, when the configuration of the head-mounted display 1 is such that the user is not caused to visually recognize the scene that the first single eye can see through the first member 121A, since the first light guiding unit 12A is not a member including the light guide member for the first single eye in the head-mounted display 1, the first light guiding unit 12A may simply be referred to as a first object, and may be configured integrally with the bridge portion 10C, or may be configured separately from the bridge portion 10C.

The first optical member 122A is an optical member that reflects the first image light output by the first image light output unit 11A to a predetermined first position. The first position is a position determined relative to the first member 121A as a position associated with the first single eye. In other words, the first position is a position that is determined relative to the first member 121A, and is a position at which the first single eye is presumed to be located when the head-mounted display 1 is mounted on the user's head in a predetermined mounting method. The first position is determined based on experiments in advance, geometric theory calculations, and the like. Further, for example, the first optical member 122A is a half mirror. In this case, the first optical member 122A is curved such that the first image light output from the first image light output unit 11A is reflected to the first position. Thus, in this case, among the end portions of the first member 121A, the end portion to which the first optical member 122A is coupled is also curved along the shape of the first optical member 122A. Since the head-mounted display 1 includes the first optical member 122A, the user can receive the first image light by the first single eye, can visually recognize the first image, and can see the scene through the first light guiding unit 12A. Therefore, in this example, the light guide member for the first single eye in the head-mounted display 1 includes the first member 121A, the first optical member 122A, and the first region R1 of the bridge portion 10C. Thus, the transmittance of light of the first optical member 122A is preferably substantially the same as or the same as each of the transmittance of light of the first member 121A and the transmittance of light of the first region R1, but may be different from either one or both of the transmittance of light of the first member 121A and the transmittance of light in the first region R1. Further, the refractive index of light of the first optical member 122A is preferably substantially the same as or the same as each of the refractive index of light of the first member 121A and the refractive index of light in the first region R1, but may be different from either one or both of the refractive index of light of the first member 121A and the refractive index of light in the first region R1. In other words, the refractive index of light of the first light guiding unit 12A is preferably substantially the same as or the same as the refractive index of light of the first region R1, but may be different from the refractive index of light of the first region R1. Furthermore, the first optical member 122A may be another optical member other than the half mirror as long as the other optical member is an optical member capable of guiding the first image light output by the first image light output unit 11A to the first single eye. Here, the other optical member may be an optical member that transmits some of light such as a half mirror, or may be an optical member that does not transmit light. For example, the other optical member may be optical fiber or the like.

The first control device 13A controls the entire first display device 10A. In the example illustrated in FIG. 1, the first control device 13A is accommodated within a housing of the first image light output unit 11A. The first control device 13A may be configured to be provided at other positions in the head-mounted display 1.

The second display device 10B is a device that causes the second single eye, which is one of the two eyes of the user, to visually recognize the second image light indicating the second image when the head-mounted display 1 is mounted on the user's head in a predetermined mounting method. Here, in this example, since the first single eye is the right eye of the user, the second single eye is the left eye of the user. The head-mounted display 1 may have a configuration in which the first single eye is the left eye of the user, and the second single eye is the right eye of the user.

The second display device 10B includes a second image light output unit 11B, a second light guiding unit 12B, and a second control device 13B.

The second image light output unit 11B is a device configured to output second image light based on second image information input from the external device. The second image information is information that indicates the second image, and may be information that indicates a still image, or may be information that indicates a moving image. In this example, the second single eye is the left eye of the user. In this case, the second image is a still image for the left eye, or a moving image for the left eye. The second image light output unit 11B may have any configuration as long as it is possible to output the second image light based on the second image information input from the external device. The second image light output unit 11B is controlled by the second control device 13B.

The second light guiding unit 12B is a member including a light guide member for a second single eye in the head-mounted display 1. The second light guiding unit 12B includes a second member 121B, or includes a second member 121B and another part of the bridge portion 10C. Further, the second light guiding unit 12B further includes a second optical member 122B that guides the second image light to a predetermined second position. Hereinafter, for convenience of description, among the portions of the bridge portion 10C, a portion included in the second light guiding unit 12B will be simply referred to as another part of the bridge portion 10C. In the following, as an example, a case in which the second light guiding unit 12B includes a second member 121B and the other part of the bridge portion 10C together with the second optical member 122B will be described. In this case, the other part of the bridge portion 10C is configured to transmit at least some of the light. Further, in this case, the transmittance of light of the second member 121B and the transmittance of light of the other part of the bridge portion 10C may be substantially the same or the same, but may be different. In this case, the refractive index of light of the second member 121B and the refractive index of the other part of the bridge portion 10C are preferably substantially the same or the same, but may be different. Hereinafter, for convenience of description, the other part of the bridge portion 10C is referred to as a second region R2. Further, hereinafter, for convenience of description, among the portions of the bridge portion 10C, a portion not included in the first region R1 and the second region R2 is referred to as a third region R3. In FIG. 1, the second region R2 and the third region R3 are omitted in order to prevent the drawing from becoming complicated. Further, the second light guiding unit 12B may be configured separately from the second optical member 122B.

The second member 121B is a member having a substantially flat plate shape that extends in a direction in which the second image light is output from the second image light output unit 11B. The second member 121B is a member that functions as a part of a light guide member for a second single eye in the head-mounted display 1. Thus, the second member 121B is a member that transmits at least some of the light. The second optical member 122B is coupled to the end portion on the above direction side among the end portions of the second member 121B. In the following, as an example, a case in which the second member 121B is a member that transmits the whole of the light will be described. At least one of the second member 121B or the second region R2 may be a member that does not transmit light when the configuration of the head-mounted display 1 is such that the user is not caused to visually recognize the scene that the second single eye can see through the second member 121B and the second region R2. When the configuration of the head-mounted display 1 is such that the user is not caused to visually recognize the scene that the second single eye can see through the second member 121B, the head-mounted display 1 may be configured not to include the second image light output unit 11B, or may include the second image light output unit 11B. When the second member 121B is a member that does not transmit light and the head-mounted display 1 includes the second image light output unit 11B, for example, a path through which the second image light output from the second image light output unit 11B passes toward the second optical member 122B, an optical fiber through which the second image light passes toward the second optical member 122B, and the like are provided in the second member 121B. In addition, when the configuration of the head-mounted display 1 is such that the user is not caused to visually recognize the scene that the first single eye can see through the second member 121B, since the second light guiding unit 12B is not a member including a light guide member for a second single eye in the head-mounted display 1, the second light guiding unit 12B may be referred to simply as a second object, and may be configured integrally with the bridge portion 10C or may be configured separately from the bridge portion 10C. However, there is no case in which the head-mounted display 1 does not include both the first image light output unit 11A and the second image light output unit 11B, and thus the head-mounted display 1 includes at least one of the first image light output unit 11A or the second image light output unit 11B.

The second optical member 122B is an optical member that reflects the second image light output by the second image light output unit 11B to a predetermined second position. The second position is a position determined relative to the second member 121B as a position associated with the second single eye. In other words, the second position is a position that is determined relative to the second member 121B, and is a position at which the second single eye is presumed to be located when the head-mounted display 1 is mounted on the user's head in a predetermined mounting method. The second position is determined based on experiments in advance, geometric theory calculations, and the like. Further, for example, the second optical member 122B is a half mirror. In this case, the second optical member 122B is curved such that the second image light output from the second image light output unit 11B is reflected to the second position. Thus, in this case, among the end portions of the second member 121B, the end portion to which the second optical member 122B is coupled is also curved along the shape of the second optical member 122B. Since the head-mounted display 1 includes the second optical member 122B, the user can receive the second image light by the second single eye, and can visually recognize the second image, and can see the scene through the second light guiding unit 12B. Therefore, in this example, the light guide member for the second single eye in the head-mounted display 1 includes the second member 121B, the second optical member 122B, and the second region R2 of the bridge portion 10C. Thus, the transmittance of light of the second optical member 122B is preferably substantially the same as or the same as each of the transmittance of light of the second member 121B and the transmittance of light of the second region R2, but may be different from either one or both of the transmittance of light of the second member 121B and the transmittance of light of the second region R2. Further, the refractive index of light of the second optical member 122B is preferably substantially the same as or the same as each of the refractive index of light of the second member 121B and the refractive index of light of the second region R2, but may be different from either one or both of the refractive index of light of the second member 121B and the refractive index of light of the second region R2. In other words, the refractive index of light of the second light guiding unit 12B is preferably substantially the same as or the same as the refractive index of light of the second region R2, but may be different from the refractive index of light of the second region R2. Furthermore, the second optical member 122B may be another optical member other than the half mirror as long as the other optical member is an optical member capable of guiding the second image light output by the second image light output unit 11B to the second single eye. Here, the other optical member may be an optical member that transmits some of light such as a half mirror, or may be an optical member that does not transmit light. For example, the other optical member may be optical fiber or the like.

The second control device 13B controls the entire second display device 10B. In the example illustrated in FIG. 1, the second control device 13B is accommodated in a housing of the second image light output unit 11B. The second control device 13B may be configured to be provided at other positions in the head-mounted display 1.

The bridge portion 10C is sandwiched between the first optical member 122A and the second optical member 122B so that the first optical member 122A and the second optical member 122B are located at symmetrical positions with respect to the bridge portion 10C interposed therebetween, and is coupled to each of the first optical member 122A and the second optical member 122B. That is, in the head-mounted display 1, the first member 121A and the second member 121B are arranged with the bridge portion 10C interposed therebetween. In other words, the bridge portion 10C is provided so as to sandwich the first optical member 122A between the bridge portion 10C and the first light guiding unit 12A. Further, the second optical member 122B is provided between the second light guiding unit 12B and the bridge portion 10C. Thus, among end portions of the bridge portion 10C, the end portion coupled to the first optical member 122A is curved along the shape of the first optical member 122A. Additionally, among the end portions of the bridge portion 10C, the end portion coupled to the second optical member 122B is curved along the shape of the second optical member 122B. For this reason, in this example, the bridge portion 10C is a member that functions as a part of the light guide member for the first single eye in the head-mounted display 1, and is also a member that functions as a part of the light guide member for the second single eye in the head-mounted display 1. Hereinafter, for convenience of description, in two directions parallel to the shortest straight line coupling the first optical member 122A and the second optical member 122B, a direction from the first optical member 122A toward the second optical member 122B will be referred to as a first direction. In this case, it can also be said that, when a predetermined direction is set as the first direction, the second light guiding unit 12B is a member supported by the bridge portion 10C with the bridge portion 10C interposed therebetween so as to be arranged together with the first light guiding unit 12A in the first direction. Further, in this case, it can also be said that the first region R1 is coupled to the first optical member 122A on one side in the first direction. In addition, in this case, it can also be said that the second region R2 is coupled to the second optical member 122B on the other side in the first direction.

Here, the bridge portion 10C has a twelfth surface M12 coupled to an eleventh surface M11 located on the side opposite to a user's face among surfaces of the first member 121A having a substantially flat plate shape when the head-mounted display 1 is mounted on the user's head in a predetermined mounting method. In other words, the twelfth surface M12 is, in this case, a surface located on the side opposite to the user's face among surfaces of the first region R1. The twelfth surface M12 is a surface parallel to the eleventh surface M11, and is smoothly coupled to the eleventh surface M11. Therefore, unless it is necessary to distinguish between the eleventh surface M11 and the twelfth surface M12, the eleventh surface M11 and the twelfth surface M12 will be collectively referred to as a first surface M1. Additionally, the bridge portion 10C has a twenty-second surface M22 coupled to a twenty-first surface M21 located on the opposite side to the user' face, in this case, among surfaces of the second member 121B having a substantially flat plate shape. In other words, the twenty-second surface M22 is, in this case, a surface located on the side opposite to the user's face among surfaces of the second region R2 described above. The twenty-second surface M22 is a surface parallel to the twenty-first surface M21, and is smoothly coupled to the twenty-first surface M21. Therefore, unless it is necessary to distinguish between the twenty-first surface M21 and the twenty-second surface M22, the twenty-first surface M21 and the twenty-second surface M22 are collectively referred to as a second surface M2.

The frame body 20 is a member corresponding to a rim when the head-mounted display 1 is regarded as eyeglasses. Thus, the frame body 20 is preferably formed of a material such as not being deformed, and thus is formed of a rigid material. The rigid material constituting the frame body 20 may be any material as long as it is a material that is rigid enough to prevent the head-mounted display 1 from being deformed during normal use The frame body 20 is coupled to the first light guiding unit 12A, the second light guiding unit 12B, and the bridge portion 10C so as to support each of the first light guiding unit 12A, the second light guiding unit 12B and the bridge portion 10C.

The first temple 30A corresponds to a temple when the head-mounted display 1 is regarded as eyeglasses, and is a member that is worn on one of user's two ears. In the following, as an example, a case in which the first temple 30A is a member that worn on a user's right ear will be described. In this case, the first temple 30A is coupled to the first member 121A so that it can be folded with respect to the first light guiding unit 12A.

The second temple 30B corresponds to a temple when the head-mounted display 1 is regarded as eyeglasses, and is a member that is worn on the other ear of the user's both ears. In this example, since the first temple 30A is a member that is worn on the user's right ear, the second temple 30B is a member that is worn on the user's left ear. Thus, the second temple 30B is coupled to the second member 121B so that it can be folded with respect to the second light guiding unit 12B. In the head-mounted display 1, the first temple 30A is a member that is worn on the user's left ear, and may have a configuration in which the second temple 30B is a member that is worn on the user's right ear.

Each of the first temple 30A and the second temple 30B is an example of a mounting unit that mounts the head-mounted display 1 on the user's head. Such a mounting unit may be another member such as a rubber belt that secures the head-mounted display 1 on the user's head by an elastic force instead of the two temples. In this case, such a mounting unit may or may not be provided in the head-mounted display 1. When such a mounting unit is not provided in the head-mounted display 1, the mounting unit is installed to the head-mounted display 1 from the outside.

Here, in the example illustrated in FIG. 1, the first image light output unit 11A is provided at an end portion coupled to the first member 121A among end portions of the first temple 30A. The first image light output unit 11A may be configured to be provided at another position in the head-mounted display 1 at which the first image light can be output toward the first optical member 122A. Additionally, in the example, the second image light output unit 11B is provided at an end portion coupled to the second member 121B among end portions of the second temple 30B. The second image light output unit 11B may be configured to be provided at another position in the head-mounted display 1 at which the second image light can be output toward the second optical member 122B.

Configuration of Coupling Member

Figure 2:
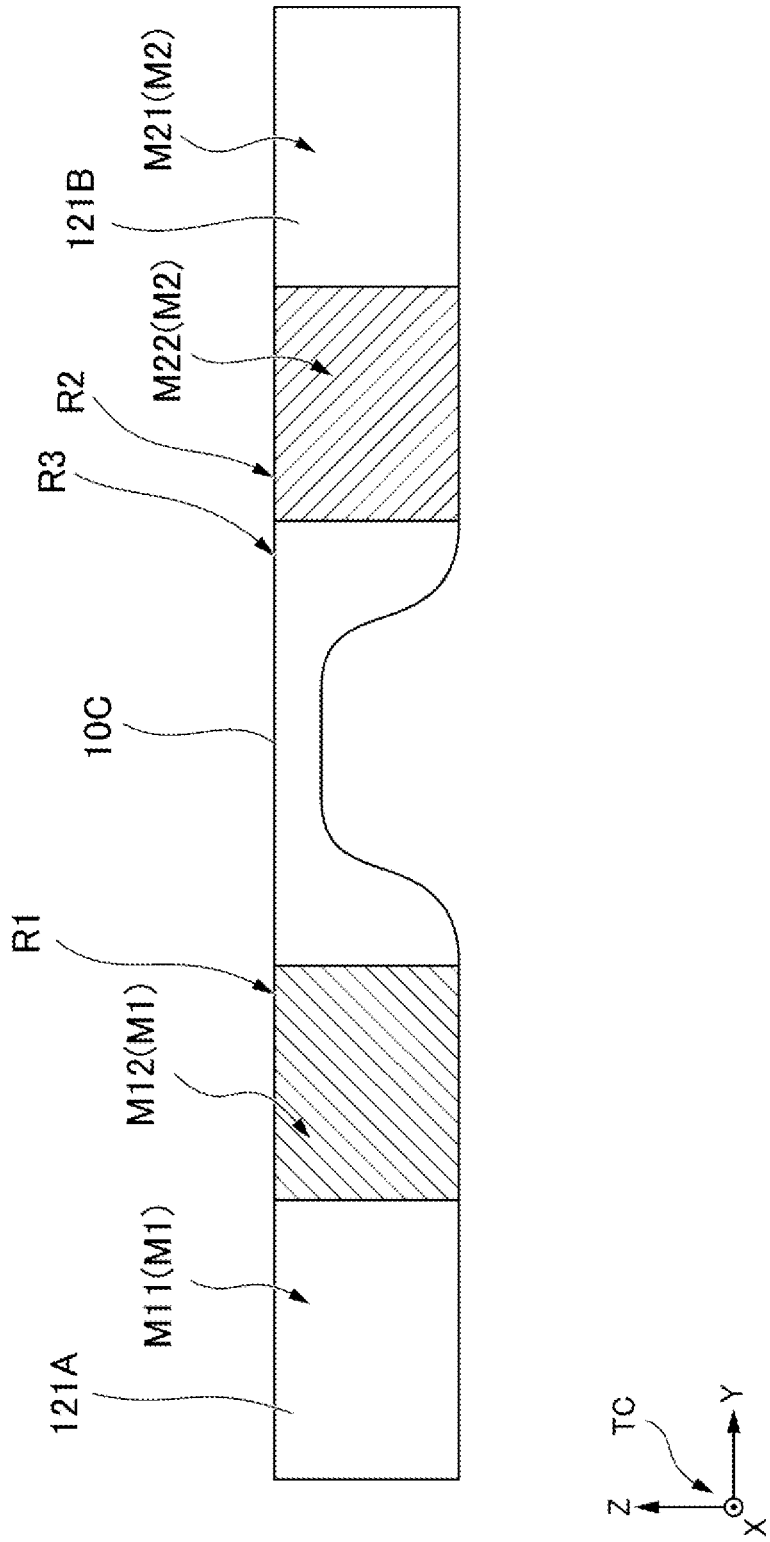
FIG. 2 is a front view of a bridge portion 10C included in the head-mounted display 1 illustrated in FIG. 1.
Figure 3:
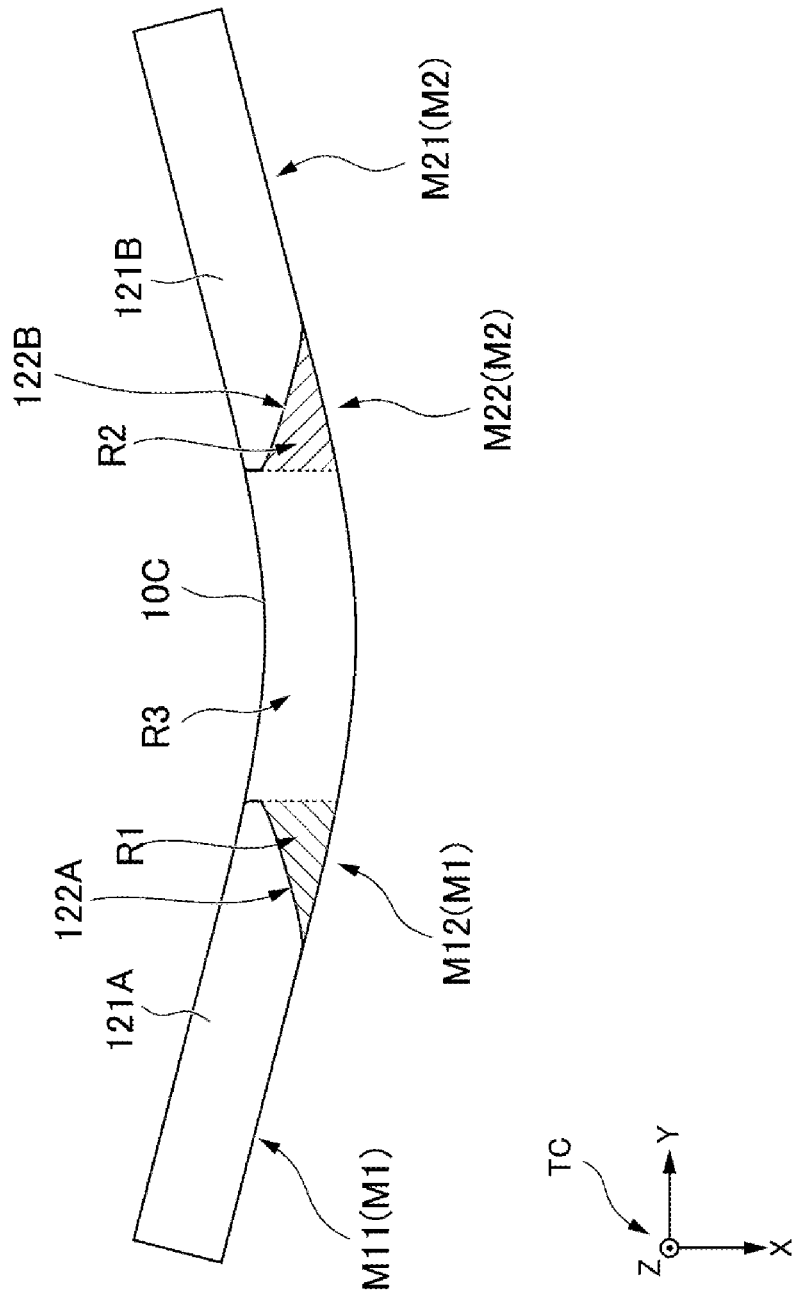
FIG. 3 is a top view of the bridge portion 10C included in the head-mounted display 1 illustrated in FIG. 1.

Referring to FIGS. 2 and 3, a more detailed configuration of the bridge portion 10C will be described.

FIG. 2 is a front view of the bridge portion 10C included in the head-mounted display 1 illustrated in FIG. 1. FIG. 3 is a top view of the bridge portion 10C included in the head-mounted display 1 illustrated in FIG. 1. A three-dimensional coordinate system TC illustrated in FIGS. 2 and 3 is a three-dimensional orthogonal coordinate system that indicates a direction in the drawing in which the three-dimensional coordinate system TC is drawn. In FIGS. 2 and 3, the head-mounted display 1 is disposed such that a positive direction of an X-axis in the three-dimensional coordinate system TC coincides with the first direction described above, and a Z-axis in the three-dimensional coordinate system TC is parallel to each of the first surface M1 and the second surface M2. Additionally, in FIGS. 2 and 3, the first region R1 and the second region R2 are indicated by different hatching. Thus, in FIGS. 2 and 3, the third region R3 is not hatched.

As illustrated in FIGS. 2 and 3, in the bridge portion 10C in this example, the third region R3 described above is located between the first region R1 and the second region R2 in the first direction. In the example illustrated in FIGS. 2 and 3, the first region R1 is a portion that overlaps the first optical member 122A among portions of the bridge portion 10C when the bridge portion 10C is seen in a negative direction of the X-axis in the three-dimensional coordinate system TC. In addition, in this example, the second region R2 is, in this case, a portion that overlaps the second optical member 122B among the portions of the bridge portion 10C. At least one of the first region R1 or the second region R2 may include a part of the third region illustrated in FIGS. 2 and 3.

The third region R3 is a region that is located between the first region R1 and the second region R2 and is not included in the first light guiding unit 12A and the second light guiding unit 12B. Thus, the third region R3 is a member that is less likely to relate to user's visibility, or a member that does not relate to the user's visibility. In addition, the third region R3 is a member that is less likely to reduce the user convenience even when the rigidity is low, when compared with each of the frame body 20 that reduces durability of the entire head-mounted display 1 when the rigidity is reduced, the first temple 30A that supports the first display device 10A by being worn on the user's right ear, and the second temple 30B that supports the second display device 10B by being worn on the user's left ear. Therefore, even when at least a part of the third region R3 is formed of an environmental material, it is thought that the user convenience for the head-mounted display 1 does not decrease. On the other hand, carbon dioxide discharged when the environmental material is combusted is carbon dioxide that is absorbed by the photosynthesis by plants as raw materials. Thus, when at least a part of the third region R3 contains an environmental material, the head-mounted display 1 can reduce an amount of carbon dioxide emission during thermal recycling. That is, when at least a part of the third region R3 is configured of the environmental material, the head-mounted display 1 is formed by using an environmental material. It is possible to reduce the amount of carbon dioxide emission during thermal recycling while deterioration in the user convenience is suppressed. The third region R3 may transmit light or may not transmit light. However, when the third region R3 transmits light, the head-mounted display 1 can widen the field of view of the user wearing the head-mounted display 1 as compared with the case in which the third region R3 does not transmit light. When the third region R3 transmits light, the transmittance of light of the third region R3 is preferably substantially the same as or the same as each of the transmittance of light of the first region R1 and the transmittance of light of the second region R2, and may be different from at least one of the transmittance of light of the first region R1 or the transmittance of light of the second region R2. Further, when the third region R3 transmits light, the refractive index of light of the third region R3 is preferably substantially the same as or the same as each of the refractive index of light of the first region R1 and the refractive index of light of the second region R2, and may be different from at least one of the refractive index of light of the first region R1 or the refractive index of light of the second region R2.

Here, the environmental material is an organic resource including a raw material from a plant, and is, for example, bio-plastics, wood, and the like. Bio-plastics include biomass plastic, biodegradable plastic, non-biodegradable plastic. Examples of the biomass plastic include bio-polyethylene, bio-polypropylene, bio-polyethylene terephthalate, byte polytrimethylene terephthalate, bio-polyamide, bio-polycarbonate, bio-polyurethane, polylactic acid, polyhydroxyalkanoate, bio-polybutylene succinate, bio-polybutylene adipate terephthalate, starch polyester resin, and the like. Examples of the biodegradable plastic include polylactic acid, polyhydroxyalkanoate, bio-polybutylene succinate, bio-polybutylene adipate terephthalate, starch polyester resin, polybutylene succinate, polybutylene adipate terephthalate, and the like. Examples of the non-biodegradable plastic include bio-polyethylene, bio-polyethylene terephthalate, bio-urethane, bio-polycarbonate, and biopolyamide. As can be seen, polylactic acid, polyhydroxyalkanoate, bio-polybutylene succinate, bio-polybutylene adipate terephthalate, starch polyester resin, and the like are biomass plastics, and are also biodegradable plastics. Also, bio-polyethylene, bio-polyethylene terephthalate, bio-urethane, bio-polycarbonate, and the like are biomass plastics, and non-biodegradable plastics. In the following, as an example, a case in which the environmental material is an amorphous polylactic acid having a heat resistance temperature of approximately 50° C. will be described. The environmental material may be configured to include a plurality of types of environmental materials.

Additionally, in the example illustrated in FIG. 2, the third region R3 has a portion of which a thickness in a direction parallel to the Z-axis in the three-dimensional coordinate system TC, that is, in a direction orthogonal to the first direction is thinner than a thickness of each of the first region R1 and the second region R2. As a result, when the head-mounted display 1 is mounted on the user's head in a predetermined mounting method, the head-mounted display 1 can suppress interference between the third region R3 and the user's nose without reducing an area of each of the first surface M1 and the second surface M2. The third region R3 may have a configuration having a portion of which a thickness in another direction intersecting the first direction is thinner than the thickness of each of the first region R1 and the second region R2. Further, the third region R3 may have a configuration having a portion of which a thickness in the direction intersecting the first direction is thinner than the thickness of any one of the first region R1 and the second region R2.

Modified Example 1 of Embodiment

Modified Example 1 of the embodiment will be described below. In Modified Example 1 of the embodiment, the head-mounted display 1 notifies the user that the head-mounted display 1 reaches the end of its life when the head-mounted display 1 reaches the end of its life. For example, the head-mounted display 1 measures the total usage time of the first image light output unit 11A as a first total usage time, measures the total usage time of the second image light output unit 11B as a second total usage time, and notifies the user that the head-mounted display 1 reaches the end of its life by means of an image, blinking light, vibration, or the like when at least one of the two measured total usage times is longer than a predetermined threshold value. For example, when such a notification is performed by an image, the head-mounted display 1 outputs the first image light of the image indicating that the head-mounted display 1 reaches the end of its life to the first image light output unit 11A. In addition, in this case, the head-mounted display 1 outputs the second image light of the image indicating that the head-mounted display 1 reaches the end of its life to the second image light output unit 11B. Further, for example, when such a notification is performed by the blinking of light, the head-mounted display 1 includes a light emitting body such as a light emitting diode (LED) that emits light indicating such a notification. Then, in this case, the head-mounted display 1 causes the light emitting body to emit light of a blinking pattern indicating that the head-mounted display 1 reaches the end of its life. Further, for example, when such a notification is performed by vibration, the head-mounted display 1 includes a vibrator that generates vibration indicating such a notification. Then, in this case, the head-mounted display 1 causes the vibrator to generate vibration of a vibration pattern indicating that the head-mounted display 1 reaches the end of its life. In the following description, such notifications are referred to as a subject notification for convenience of description. The subject notification may be another notification corresponding to each of the first total usage time being longer than the threshold value and the second total usage time being longer than the threshold value, instead of the notification indicating that the head-mounted display 1 reaches the end of its life. Here, in the head-mounted display 1, any one of the first control device 13A and the second control device 13B may perform the measurement, or both the first control device 13A and the second control device 13B may perform the measurement. In the following, as an example, a case in which the first control device 13A performs the measurement of the first total usage time and the subject notification according to the first total usage time, and the second control device 13B performs the measurement of the second total usage time and the subject notification according to the second total usage time will be described.

Here, as an example, a case in which the configuration of the second control device 13B is the same as the configuration of the first control device 13A will be described below, except that the second image light output unit 11B is controlled by the second control device 13B. Therefore, the configuration of the second control device 13B will be omitted. Further, as an example, a case in which a process of performing the subject notification by the second control device 13B is the same as a process of performing the subject notification by the first control device 13A will be described, except that the second image light output unit 11B is controlled by the second control device 13B. Therefore, the process of performing the subject notification by the second control device 13B will be omitted.

Figure 4:
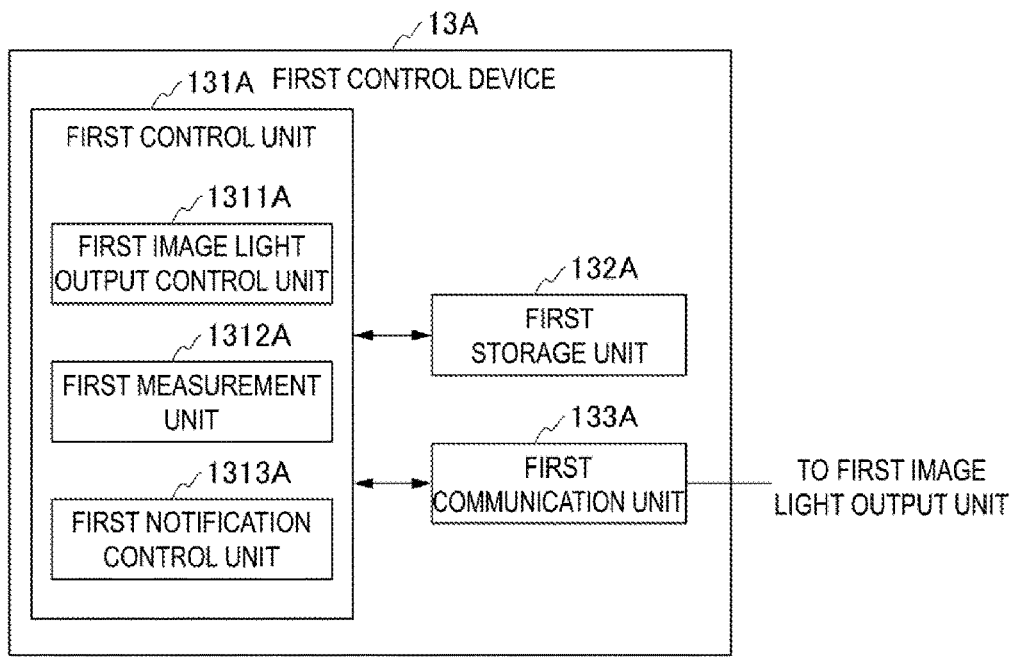
FIG. 4 is a diagram illustrating an example of a configuration of a first control device 13A.

FIG. 4 is a diagram illustrating an example of the configuration of the first control device 13A.

The first control device 13A includes a first control unit 131A, a first storage unit 132A, and a first communication unit 133A.

The first control unit 131A controls the entire first control device 13A and controls the entire first image light output unit 11A. The first control unit 131A is a processor, and is, for example, a microcomputer, a central processing unit (CPU), a digital signal processor (DSP), or the like. The first control unit 131A executes various programs stored in the first storage unit 132A. The first control unit 131A may be configured of a plurality of hardware, or may be configured of a single processor. Further, the first control unit 131A may be hardware programmed to realize each function of the first control device 13A. In other words, the first control unit 131A may have a configuration in which various programs stored in the first storage unit 132A are mounted as hardware circuits. In this case, for example, the first control unit 131A is configured of an application specific integrated circuit (ASIC), a field programmable gate array (FPGA), or the like.

As illustrated in FIG. 4, for example, a functional unit realized by the first control unit 131A executing various programs includes a first image light output control unit 1311A, a first measurement unit 1312A, and a first notification control unit 1313A. The functional unit may include another functional unit.

The first image light output control unit 1311A controls the first image light output unit 11A.

The first measurement unit 1312A is configured to measure the total usage time of the first image light output unit 11A as the first total usage time. For example, the first measurement unit 1312A is configured to measure the first total usage time by integrating the time when the first image light output unit 11A is outputting light. A method for measuring the first total usage time by the first measurement unit 1312A may be another method according to the use of the first image light output unit 11A.

The first notification control unit 1313A controls a device, a member, or the like, such as the first image light output unit 11A, the light emitting body, and the vibrator, that is subject to the subject notification, and causes the subject notification to be performed.

Figure 5:
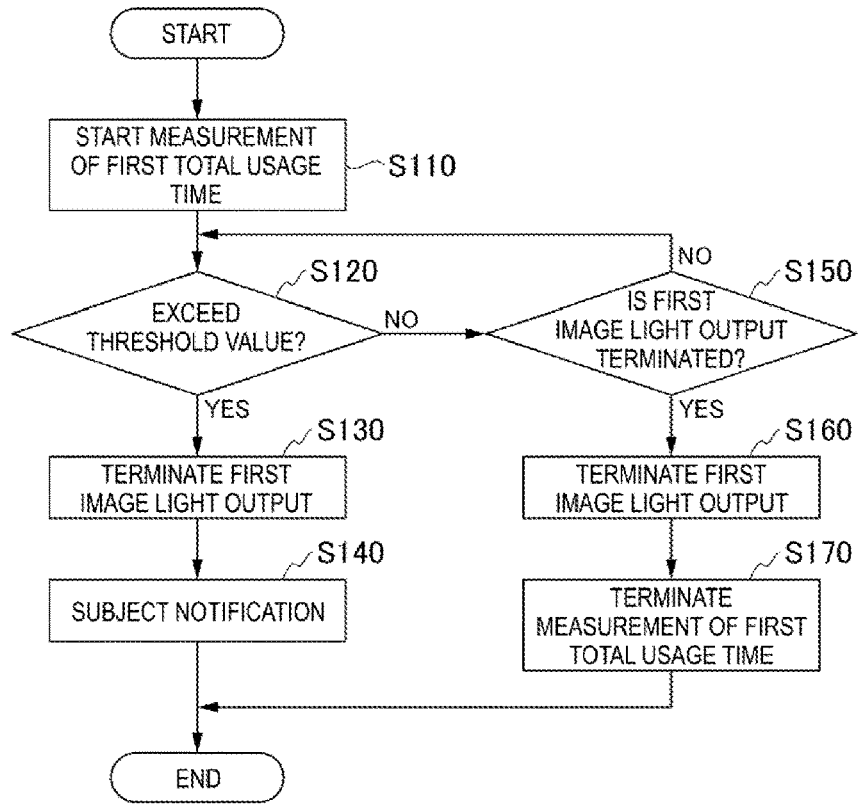
FIG. 5 is a diagram illustrating an example of a process flow in which the first control device 13A performs subject notification.

FIG. 5 is a diagram illustrating an example of a process flow in which the first control device 13A performs the subject notification. As an example, a case in which a variable for storing the first total usage time is stored in the first storage unit 132A as a first total usage time variable will be described below. Further, as an example, a case in which the first total usage time stored in the first total usage time variable is initialized to zero [hour] when the head-mounted display 1 is shipped will be described below. Further, as an example, a case in which the first control unit 131A repeatedly performs processing of a flowchart illustrated in FIG. 5 whenever the first image light output unit 11A that is not outputting the first image light starts to output the first image light will be described below.

When the first image light output unit 11A starts to output the first image light, the first measurement unit 1312A starts the measurement of the first total usage time (Step S110). That is, in Step S110, the first measurement unit 1312A starts processing to add a predetermined unit time to a value stored in the first total usage time variable whenever the unit time elapses from a timing at which the first image light output unit 11A starts to output the first image light. The predetermined unit time may be 1 second, may be a time shorter than 1 second, and may be a time longer than 1 second.

Next, the first notification control unit 1313A determines whether the first total usage time stored in the first total usage time variable of the first measurement unit 1312A exceeds the predetermined threshold value (Step S120). The predetermined threshold value is, for example, a durable time of the first image light output unit 11A. The predetermined threshold value is determined by experiments in advance, theoretical calculations, and the like.

In Step S120, when the first notification control unit 1313A determines that the first total usage time does not exceed the predetermined threshold value (Step S120—NO), the first image light output control unit 1311A determines whether or not the output of the first image light is terminated (Step S150). For example, when the head-mounted display 1 receives an operation to terminate display of the image from the external device, the first image light output control unit 1311A determines that the output of the first image light is terminated. Further, for example, when the head-mounted display 1 has not received the operation to terminate the display of the image from the external device, the first image light output control unit 1311A determines that the output of the first image light is not terminated.

When the first image light output control unit 1311A determines that the output of the first image light should be terminated in Step S150 (Step S150—YES), the first image light output control unit 1311A causes the first image light output unit 11A to terminate the output of the first image light (Step S160).

Next, the first measurement unit 1312A terminates the measurement of the first total usage time started in Step S110 (Step S170), and terminates the processing of the flowchart illustrated in FIG. 5.

On the other hand, when the first image light output control unit 1311A determines that the output of the first image light is not terminated in Step S150 (Step S150—NO), the first notification control unit 1313A proceeds to Step S120, and again determines whether the first total usage time stored in the first total usage time variable of the first storage unit 132A exceeds the predetermined threshold value.

On the other hand, when the first notification control unit 1313A determines that the first total usage time exceeds the predetermined threshold value in Step S120 (Step S120—YES), the first image light output control unit 1311A causes the first image light output unit 11A to terminate the output of the first image light (Step S130).

Next, the first notification control unit 1313A controls the first image light output unit 11A, the light emitting body, the vibrator, and the like, causes the subject notification to be performed (Step S140), and terminates the processing of the flowchart illustrated in FIG. 5.

As described above, the head-mounted display 1 notifies the user that the head-mounted display 1 reaches the end of its life when the head-mounted display 1 reaches the end of its life. As a result, the head-mounted display 1 can suppress the user continuing to use the head-mounted display 1 that has reached the end of its life.

Modified Example 2 of Embodiment

Modified Example 2 of the embodiment will be described below. Modified Example 2 of the embodiment is a modified example of Modified Example 1 of the embodiment. In Modified Example 2 of the embodiment, the head-mounted display 1 heats the third region R3 as the subject notification, and deforms the head-mounted display 1 when the measured first total usage time exceeds a predetermined threshold value. Additionally, in the modified example of the embodiment, the head-mounted display 1 heats the third region R3 as the subject notification, and deforms the head-mounted display 1 when the measured second total usage time exceeds a predetermined threshold value. Thus, for example, the head-mounted display 1 can change the head-mounted display 1 that has reached the end of its life into an unusable state, and thus can suppress the user continuing to use the head-mounted display 1 that has reached the end of its life.

In Modified Example 2 of the embodiment, the head-mounted display 1 includes a heating portion HT and a deforming portion TF.

Figure 6:
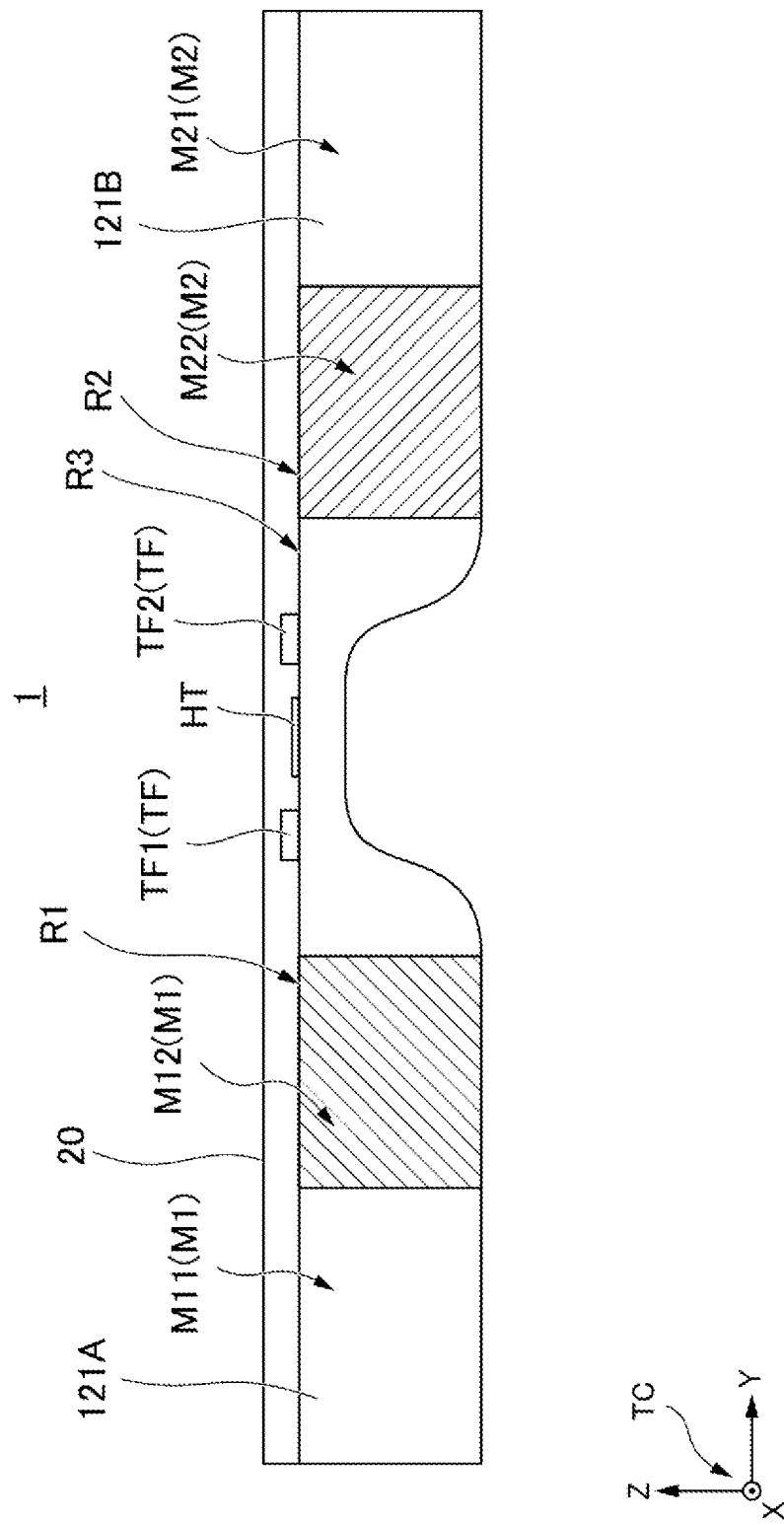
FIG. 6 is a front view illustrating an example of a configuration of the head-mounted display 1 including a heating portion HT and a deforming portion TF.

FIG. 6 is a front view illustrating an example of a configuration of the head-mounted display 1 including the heating portion HT and the deforming portion TF. In FIG. 6, the head-mounted display 1 is disposed such that the positive direction of the X-axis in the three-dimensional coordinate system TC coincides with the first direction described above and the Z-axis in the three-dimensional coordinate system TC is parallel to each of the first surface M1 and the second surface M2. Hereinafter, for convenience of description, the positive direction of the Z-axis of the three-dimensional coordinate system TC in FIG. 6 is described as referred to as an upper side or an upward direction.

The heating portion HT is, for example, a heating element such as a heating coil. The heating portion HT is heated by at least one of the first control device 13A or the second control device 13B. Thus, the heating portion HT can heat a portion that is in contact with the heating portion HT, among the portions of the third region R3. Here, among the portions of the third region R3, the portion that is in contact with the heating portion HT is formed of an environmental material. This is because the heat resistance temperature of the environmental material is lower than that of a resin material other than the environmental material. The environmental material having a low heat resistance temperature almost loses the elasticity thereof at a temperature lower than a temperature at which the resin material almost loses its elasticity. For example, an amorphous polylactic acid that is an environmental material in this example has a heat resistance temperature of approximately 50° C. as described above. Meanwhile, the heat resistance temperature of the resin material is approximately 80° C. Many of the resin materials have a heat resistance temperature exceeding 100° C. That is, the amorphous polylactic acid almost loses the elasticity at a temperature of approximately 50° C. that is lower than the temperature at which the resin material almost loses the elasticity. As a result, the heating portion HT can easily heated the third region R3 until it becomes easily deformable, and can improve safety of the user who may come into contact with the third region R3 heated by the heating portion HT. In the following, as an example, a case in which the entire third region R3 is configured of an environmental material will be described.

The heating portion HT is provided between the frame body 20 and the third region R3. That is, the heating portion HT is provided at an end portion on the upward direction side, among the end portions of the third region R3. Additionally, in the example illustrated in FIG. 6, the heating portion HT is provided at the end portion in the vicinity of the center of the third region R3 in the first direction. This is because the vicinity of the center of the third region R3 in the first direction has the thinnest thickness, is easily heated up, and is easily deformed when the temperature rises. Also, this is to facilitate the loss of the overall elasticity of the third region R3 by heating. The heating portion HT may be provided at another position at which the third region R3 can be heated. Further, the heating portion HT may be provided at an end portion on the side of the direction intersecting the first direction, among the end portions of the third region R3.

The deforming portion TF deforms the third region R3 that has almost lost the elasticity by being heated by the heating portion HT. The deforming portion TF includes, for example, at least one elastic member, and deforms the third region R3 by an elastic force of the at least one elastic member in accordance with heating of the third region R3. The deforming portion TF may be a device that causes the third region R3 heated by the heating portion HT to be deformed in accordance with control of at least one of the first control device 13A or the second control device 13B.

In the example illustrated in FIG. 6, the deforming portion TF includes two elastic members including a first elastic member TF1 and a second elastic member TF2. Each of the two elastic members may be a coil spring, or may be other elastic members such as a leaf spring. Further, the two elastic members may also be different types of elastic members.

Additionally, in the example illustrated in FIG. 6, the first elastic member TF1 and the second elastic member TF2 are arranged side by side in the first direction, and are disposed between the frame body 20 and the third region R3. In addition, in this example, the first elastic member TF1 and the second elastic member TF2 are provided between the frame body 20 and the third region R3 so that the heating portion HT is located between the first elastic member TF1 and the second elastic member TF2. Thus, the first elastic member TF1 and the second elastic member TF2 can deform the third region R3 by the elastic force when the elasticity of the third region R3 is lost due to heating of the heating portion HT. At least one of the first elastic member TF1 or the second elastic member TF2 may be provided in other positions at which the third region R3 can be deformed by the elastic force in this case.

Figure 7:
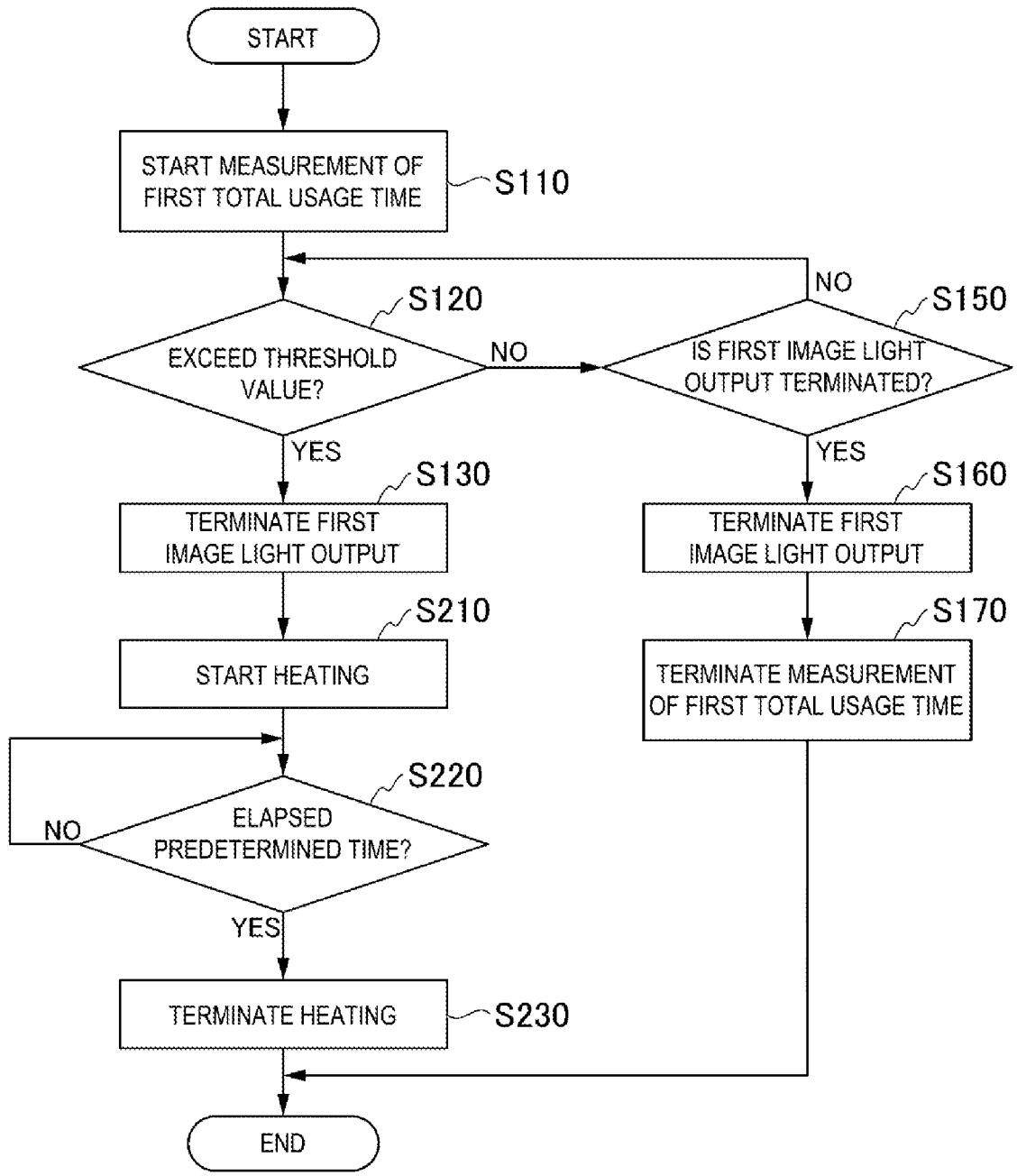
FIG. 7 is a diagram illustrating another example of the process flow in which the first control device 13A performs the subject notification.

FIG. 7 is a diagram illustrating another example of the process flow in which the first control device 13A performs the subject notification. As an example, a case in which the variable storing the first total usage time is stored in the first storage unit 132A as the first total usage time variable will be described below. Further, as an example, a case in which the first total usage time stored in the first total usage time variable is initialized to 0 [h] when the head-mounted display 1 is shipped will be described below. Further, as an example, a case in which the first control unit 131A repeatedly performs the process of the flowchart illustrated in FIG. 7 whenever the first image light output unit 11A that is not outputting the first image light starts to output the first image light will be described. Furthermore, since the processes of Steps S110 to S130 illustrated in FIG. 7 are the same as the processes of Steps S110 to S130 illustrated in FIG. 5, the description thereof will be omitted. Furthermore, the processes of Steps S150 to S170 illustrated in FIG. 7 are the same as the processes of Steps S150 to S170 illustrated in FIG. 5, and thus the description thereof will be omitted. However, after the process of Step S170 is terminated, the first notification control unit 1313A does not terminate the processes of the flowchart illustrated in FIG. 7, and proceeds to Step S230.

After the process of Step S130 is performed, the first notification control unit 1313A causes the heating portion HT to start the heating of the third region R3 (Step S210). For example, the first notification control unit 1313A starts to energize the heating portion HT in Step S210 and thus causes the heating portion HT to start the heating of the third region R3.

Next, the first notification control unit 1313A waits until a predetermined time elapses from a timing at which the process of Step S210 is started (Step S220). The predetermined time is a time required for the elasticity of the third region R3 to be lost due to the heating started by the process of Step S210, and is determined by the experiment in advance, the theoretical calculation, and the like. Due to the heating of the third region R3 by the heating portion HT, the third region R3 loses the elasticity until the predetermined time elapses, and is deformed by the respective elastic forces of the first elastic member TF1 and the second elastic member TF2. Thus, for example, the head-mounted display 1 can change the head-mounted display 1 that has reached the end of its life into an unusable state, and thus can suppress the user continuing to use the head-mounted display 1 that has reached the end of its life.

Next, when it is determined that a predetermined time has elapsed from the timing at which the process of Step S210 was started (Step S230—YES), the first notification control unit 1313A causes the heating portion HT to terminate the heating of the third region R3 (Step S230), and terminates the process of the flowchart illustrated in FIG. 7. As described above, the process of Step S230 is also performed after the process of Step S170 is performed.

As described above, the head-mounted display 1 heats the third region R3 as the subject notification and causes the head-mounted display 1 to be deformed when the measured first total usage time is greater than the predetermined threshold value. Thus, for example, the head-mounted display 1 can change the head-mounted display 1 that has reached the end of its life into an unusable state, and thus can suppress the user continuing to use the head-mounted display 1 that has reached the end of its life.

In the head-mounted display 1 according to Modified Example 2 of the embodiment, the heating portion HT and the deforming portion TF may be configured to heat and deform another portion among the portions of the head-mounted display 1, instead of the third region R3. In this case, each of the heating portion HT and the deforming portion TF is provided so as to be in contact with the other portion.

Additionally, in the head-mounted display 1 according to Modified Example 2 of the embodiment, the heating portion HT may be replaced with a heat dissipation member coupled to at least one of the first image light output unit 11A or the second image light output unit 11B. The heat dissipation member heats the third region R3 by thermal conduction from at least one of the first image light output unit 11A or the second image light output unit 11B. Thus, at least one of the first image light output unit 11A or the second image light output unit 11B is coupled to the heat dissipation member by, for example, a wire formed of a material having high thermal conductivity. However, in this case, a coupling state between at least one of the first image light output unit 11A or the second image light output unit 11B, and the heat dissipation member is switched to one of separation and coupling in accordance with control of at least one of the first image light output unit 11A or the second image light output unit 11B. Thus, in this case, the head-mounted display 1 includes a member that can perform such switching.

The head-mounted display 1 according to Modified Example 2 of the embodiment may be configured to include a detection unit that detects mounting of the head-mounted display 1 on the user's head. Such a detection unit is, for example, a gyro sensor, a proximity sensor, or the like, but is not limited thereto. In this case, for example, the first notification control unit 1313A causes the heating portion HT to heat the third region R3 when the first total usage time measured by the first measurement unit 1312A exceeds the predetermined threshold value and the mounting is not detected by such a detection unit. Thus, the head-mounted display 1 can more reliably improve the safety of the user during heating of the third region R3.

Additionally, in Modified Example 1 and Modified Example 2 of the embodiment, the bridge portion 10C may be configured not to contain the environmental material. This is because the reason why a portion that is in contact with the heating portion HT among the portions of the third region R3 is made of the environmental material is to facilitate the deformation of the third region R3 due to the heating by the heating portion HT. However, the reason why the portion that is in contact with the heating portion HT among the portions of the third region R3 is made of the environmental material is also to reduce the heat resistance temperature of the third region R3 and to improve the safety when the heated third region R3 is touched by the user as described above. Therefore, also, in Modified Example 1 and Modified Example 2 of the embodiment, preferably, the portion that is in contact with the heating portion HT among the portions of the third region R3 is formed of the environmental material.

In addition, in the embodiment, Modified Example 1 of the embodiment, and Modified Example 2 of the embodiment, at last a part of the first region R1 may be configured of the environmental material. In this case, the transmittance of light of the environmental material is preferably substantially the same as or the same as the transmittance of light of the first optical member 122A, but may be different therefrom. Further, in this case, the refractive index of light of the environmental material is preferably substantially the same as or the same as the refractive index of light of the first optical member 122A, but may be different therefrom. In addition, in the embodiment, Modified Example 1 of the embodiment, and Modified Example 2 of the embodiment, at least a part of the second region R2 may be configured of the environmental material. In this case, the transmittance of light of the environmental material is preferably substantially the same as or the same as the transmittance of light of the second optical member 122B, but may be different therefrom. In this case, the refractive index of light of the environmental material is preferably substantially the same as or the same as the refractive index of light of the second optical member 122B, but may be different therefrom.

Further, the first control device 13A and the second control device 13B described above may be integrally configured.

Difference Between Properties of Known Resin Material and Properties of Environmental Material A difference between properties of a known resin material and properties of an environmental material will be described below. FIG. 8 is a diagram illustrating an example of the difference between the properties of the known resin material and the properties of the environmental material.

A table illustrated in FIG. 8 is a table that shows properties of four types of materials including an amorphous polylactic acid that is a biodegradable environmental material used in the head-mounted display 1 described above, a polyhydroxybutyric acid that is an example of the biodegradable environmental material other than amorphous polylactic acid, a bio-polyethylene that is an example of a non-biodegradable environmental material, and a cycloolefin polymer that is an example of a known resin material. In the example illustrated in FIG. 8, as the properties of the four types of materials, each of four types of properties including glass transition temperature, tensile strength, strength at break, and flexural strength are shown. The glass transition temperature of the four types of properties is the heat resistance temperature, that is, the temperature at which the elasticity is almost lost.

As illustrated in FIG. 8, the glass transition temperature of each of three types of environmental materials including amorphous polylactic acid, polyhydroxybutyric acid, and bio-polyethylene is lower than the glass transition temperature of cycloolefin polymer. Such a tendency can be obtained similarly even when compared with any combination as a combination of a known resin material and an environmental material. On the other hand, for the tensile strength and the flexural strength, the amorphous polylactic acid has substantially the same properties as the cycloolefin polymer. For such reasons, the amorphous polylactic acid is considered as an appropriate material that replaces the known resin material.

Difference in Properties Between Multiple Types of Environmental Materials

Next, with reference to FIG. 9, a difference in properties between the plurality of types of environmental materials is described. FIG. 9 is a diagram illustrating an example of the difference in properties between four types of environmental materials.

The table illustrated in FIG. 9 is a table showing the properties of four environmental materials including amorphous polylactic acid (amorphous PLA), polybutylene succinate (PBS), bio-polyethylene (bio-PE), bio-polyethylene terephthalate (bio-PET) which are biodegradable environmental materials used in the head-mounted display 1 described above. In the example illustrated in FIG. 9, as the properties of the four types of environmental materials, four types of properties including the presence or absence of bio-degradability, crystal melting point, glass transition temperature, and load deformation temperature are shown. In FIG. 9, the presence of bio-degradability is indicated by "good". Also, in FIG. 9, the absence of bio-degradability is indicated by "poor".

Here, in view of the environmental problem, preferably, the head-mounted display 1 is made of a biodegradable environmental material. Among the four types of environmental materials illustrated in FIG. 9, environmental materials having bio-degradability are two types of environmental materials of amorphous polylactic acid and polybutylene succinate. In the two types of environmental materials, the polybutylene succinate has a glass transition temperature of −32° C. that is lower than 0° C. When the environmental material having such a glass transition temperature is used, it is difficult for the head-mounted display 1 to maintain a shape thereof. From such circumstances, it is considered preferable to use amorphous polylactic acid in the head-mounted display 1.

As described above, the head-mounted display according to the embodiment includes a first image light output unit configured to output first image light, a first light guiding unit configured to guide the first image light output by the first image light output unit, a first optical member configured to reflect the first image light guided by the first light guiding unit to a predetermined first position, and a bridge portion provided to sandwich the first optical member between the first light guiding unit and the bridge portion, wherein at least a part of the bridge portion contains an environmental material. Thus, the head-mounted display can reduce the amount of carbon dioxide emission during thermal recycling while a decrease in convenience of the user due to the use of the environmental material is suppressed. Here, in the example described above, the head-mounted display 1 is an example of the head-mounted display. Further, in the example described above, the first image light output unit 11A is an example of the first image light output unit. Further, in the example described above, the first light guiding unit 12A or the first member 121A is an example of the first light guiding unit. Further, in the example described above, the first optical member 122A is an example of the first optical member. Further, in the example described above, the bridge portion 10C is an example of the bridge portion. Further, in the example described above, amorphous polylactic acid is an example of the environmental material.

Furthermore, a configuration in which the head-mounted display includes a second image light output unit configured to output second image light, a second light guiding unit positioned in line with the first light guiding unit in a first direction and configured to guide the second image light output by the second image light output unit, and a second optical member configured to reflect, to a predetermined second position, the second image light guided by the second light guiding unit, and the second optical member is provided between the second light guiding unit and the bridge portion may be used. Here, in the example described above, the second image light output unit 11B is an example of the second image light output unit. Further, in the example described above, the second light guiding unit 12B or the second member 121B is an example of the second light guiding unit. Further, in the example described above, the second optical member 122B is an example of the second optical member.

In addition, in the head-mounted display, a configuration in which the bridge portion has a first region coupled to the first optical member on one side in a first direction, a second region coupled to the second optical member on the other side in the first direction, and a third region located between the first region and the second region in the first direction, and the third region is an environmental material may be used. Here, in the example described above, the first region R1 is an example of the first region. Further, in the example described above, the second region R2 is an example of the second region. Further, in the example described above, the third region R3 is an example of the third region.

In addition, in the head-mounted display, a configuration in which the third region has a portion of which a thickness in a second direction intersecting the first direction is thinner than a thickness of each of the first region and the second region may be used. Here, in the example described above, a direction parallel to the Z-axis in the three-dimensional coordinate system TC is an example of the second direction.

In addition, in the head-mounted display, a configuration in which a refractive index of the first region of the bridge portion is substantially the same as a refractive index of the first light guiding unit, a refractive index of the second region of the bridge portion is substantially the same as a refractive index of the second light guiding unit, and at least one of the first region or the second region is an environmental material may be used.

In addition, in the head-mounted display, a configuration in which a heat dissipation member provided in the third region is provided, and the heat dissipation member is coupled to the first image light output unit and heats the third region by heat conduction from the first image light output unit may be used.

Also, in the head-mounted display, a configuration in which a heating portion provided in the third region and configured to heat the third region is provided may be used. Here, in the example described above, the heating portion HT is an example of the heating portion.

Additionally, in the head-mounted display, a configuration in which the heating portion is provided at an end portion in a direction intersecting the first direction among end portions of the third region may be used.

Further, in the head-mounted display, a configuration in which a control unit is provided, and the control unit measures a total usage time of the first image light output unit as a first total usage time, and causes the heating portion to heat the third region based on the measured first total usage time may be used. Here, in the example described above, the first control unit 131A is an example of the control unit.

Further, in the head-mounted display, a configuration in which a detection unit configured to detect mounting of the head-mounted display on the head of a person is provided, and the control unit causes the heating portion to perform heating when the measured first total usage time exceeds a predetermined threshold value, and the mounting is not detected may be used.

Further, in the head-mounted display, a configuration in which a deforming portion configured to deform the third region in accordance with heating of the third region is provided may be used. Here, in the example described above, the deforming portion TF is an example of the deforming portion.

In addition, in the head-mounted display, a configuration in which the deforming portion includes at least one elastic member and deforms the third region due to an elastic force of the at least one elastic member in accordance with heating of the third region may be used. Here, in the example described above, each of the first elastic member TF1 and the second elastic member TF2 is an example of the at least one elastic member.

Further, in the head-mounted display, a configuration in which a rigid member having a portion configured to extend in the first direction, and provided to support each of the first light guiding unit, the second light guiding unit, and the bridge portion is provided, the at least one elastic member includes a first elastic member and a second elastic member, the first elastic member and the second elastic member are provided between the bridge portion and the rigid member in a direction intersecting the first direction, and the heating portion is provided between the bridge portion and the rigid member and is located between the first elastic member and the second elastic member in the first direction may be used. Here, in the example described above, the frame body 20 is an example of the elastic member. Further, in the example described above, the first elastic member TF1 is an example of the first elastic member. Further, in the example described above, the second elastic member TF2 is an example of the second elastic member TF2.

In addition, in the head-mounted display, a configuration in which the environmental material is an organic resource including a plant-derived raw material, and the environmental material is a biodegradable plastic or non-biodegradable plastic may be used.

Although the embodiments of this disclosure have been described in detail with reference to the drawings, the specific configurations are not limited to this embodiment, and may be modified, substituted, deleted, and the like unless otherwise the spirit of the disclosure is limited.

In addition, a program for realizing the functions of any constituent units of the device described above may be recorded in a computer-readable recording medium, and the program may be read and executed by a computer system. The device is, for example, the head-mounted display 1, the first display device 10A, the second display device 10B, and the like. Further, the "computer system" mentioned here is assumed to include hardware such as an operating system (OS) or a peripheral apparatus. Furthermore, the "computer-readable recording medium" refers to a portable medium such as a flexible disk, a magneto-optical disk, a ROM, a compact disc (CD)-ROM, and a storage device such as a hard disk built into a computer system. Furthermore, the "computer-readable recording medium" is assumed to include one that holds a program for a certain period of time, such as a volatile memory (RAN) inside a computer system serves as a server or a client when the program is transmitted via a network such as the Internet or a communication line such as a telephone line.

In addition, the program described above may be transmitted from a computer system storing the program in a storage device or the like via a transmission medium, or to another computer system using transmission waves in a transmission medium. Here, the "transmission medium" for transmitting a program refers to a medium having a function of transmitting information, like a network (a communication network) such as the Internet or a communication line such as a telephone line.

In addition, the above-described program may be to realize some of the functions described above. Furthermore, the program may be a so-called difference file (a difference program) that can realize the functions described above in combination with a program already recorded in the computer system.

What is claimed is:

1. A head-mounted display, comprising:
   a first image light output unit configured to output first image light;
   a first light guiding unit configured to guide the first image light output by the first image light output unit;
   a first optical member configured to reflect, to a predetermined first position, the first image light guided by the first light guiding unit;
   a second image light output unit configured to output second image light;
   a second light guiding unit positioned in line with the first light guiding unit in a first direction and configured to guide the second image light output by the second image light output unit; and
   a second optical member configured to reflect, to a predetermined second position, the second image light guided by the second light guiding unit; and
   a bridge portion provided so as to sandwich the first optical member between the first light guiding unit and the bridge portion, and to sandwich the second optical member between the second light guiding unit and the bridge portion, wherein
   a part of the bridge portion is configured to transmit at least some of the first image light, a second part of the bridge portion is configured to transmit at least some of the second image light,
   at least a third part of the bridge portion includes an environmental material,
   wherein the third part of the bridge portion is between the part of the bridge portion and the second part of the bridge portion.

2. The head-mounted display according to claim 1, wherein
   the bridge portion includes
   a first region coupled to the first optical member on one side in the first direction,
   a second region coupled to the second optical member on another side in the first direction, and
   a third region located between the first region and the second region in the first direction, and
   the third region includes an environmental material.

3. The head-mounted display according to claim 2, wherein the third region has a portion of which thickness in a second direction intersecting the first direction is thinner than a thickness of each of the first region and the second region.

4. The head-mounted display according to claim 2, wherein
   a refractive index of the first region of the bridge portion is substantially same as a refractive index of the first light guiding unit,
   a refractive index of the second region of the bridge portion is substantially same as a refractive index of the second light guiding unit, and at least one of the first region or the second region includes an environmental material.

5. The head-mounted display according to claim 2, comprising a heat dissipation member provided in the third region, wherein
the heat dissipation member is coupled to the first image light output unit and heats the third region by heat conduction from the first image light output unit.

6. The head-mounted display according to claim 2, comprising a heating portion provided in the third region and configured to heat the third region.

7. The head-mounted display according to claim 6, wherein the heating portion is provided at an end portion, of the third region, in a direction intersecting the first direction.

8. The head-mounted display according to claim 6, comprising a control unit, wherein
the control unit is configured to measure a total usage time of the first image light output unit as a first total usage time and to cause the heating portion to heat the third region based on the measured first total usage time.

9. The head-mounted display according to claim 8, comprising a detection unit configured to detect that the head-mounted display is mounted on a head of a person, wherein
the control unit causes the heating portion to perform heating when the measured first total usage time exceeds a predetermined threshold value and when the mounting is not detected.

10. The head-mounted display according to claim 6, comprising a deforming portion configured to deform the third region in response to the third region being heated.

11. The head-mounted display according to claim 10, wherein the deforming portion includes at least one elastic member to deform the third region by an elastic force of the at least one elastic member in response to the third region being heated.

12. The head-mounted display according to claim 11, comprising a rigid member having a portion extending in the first direction, and provided to support each of the first light guiding unit, the second light guiding unit, and the bridge portion, wherein
the at least one elastic member includes a first elastic member and a second elastic member,
the first elastic member and the second elastic member are provided between the bridge portion and the rigid member in a direction intersecting the first direction, and
the heating portion is provided between the bridge portion and the rigid member and is located between the first elastic member and the second elastic member in the first direction.

13. The head-mounted display of claim 1, wherein
the environmental material is an organic resource including a plant-derived raw material, and
the environmental material is a biodegradable plastic or non-biodegradable plastic.

* * * * *